United States Patent [19]

Giovanni

[11] Patent Number: 5,046,753
[45] Date of Patent: Sep. 10, 1991

[54] REAR SUSPENSION SYSTEM ADJUSTABLE TO MAKE THE REAR WHEELS ASSUME A PREDETERMINED TOE ALIGNMENT DURING CORNERING WITHOUT EFFECTING THE WHEELS CAMBER ANGLE SETTING

[76] Inventor: John Giovanni, 83 Rugby St., Cranston, R.I. 02910

[21] Appl. No.: 456,470

[22] Filed: Dec. 26, 1989

[51] Int. Cl.⁵ .............................................. B60G 11/08
[52] U.S. Cl. ..................................... 280/699; 180/362
[58] Field of Search ............... 280/660, 673, 675, 688, 280/690, 699, 719

[56] References Cited

U.S. PATENT DOCUMENTS

| 3,426,862 | 2/1969 | Wilfert | 280/699 |
| 4,373,743 | 2/1983 | Parsons, Jr. | 280/675 |
| 4,740,011 | 4/1988 | Mitobe et al. | 280/690 |

OTHER PUBLICATIONS

Automotive Suspension and Steering, second edition, Shedon L. Abbott and Ivan D. Hinerman, Glencoe Pub. Co. 1982, p. 193.

Primary Examiner—Charles A. Marmor
Assistant Examiner—Karin Tyson

[57] ABSTRACT

An independent rear wheel suspension system having top and bottom parallel struts which are linked to a control arm and which make each rear wheel produce predetermined cornering toe alignment with no effective change to the camber angle of the wheels. The angle of the struts at rest as viewed in reference to a leveled ground plane is used to predetermine the wheels' toe change during cornering. The limits of wheels' toe change are conditional to the spring rate acting on each rear wheel. The camber angle and the cornering toe alignment of the wheels can be adjusted independently from each other.

3 Claims, 6 Drawing Sheets

REAR SUSPENSION SYSTEM ADJUSTABLE TO MAKE THE REAR WHEELS ASSUME A PREDETERMINED TOE ALIGNMENT DURING CORNERING WITHOUT EFFECTING THE WHEELS CAMBER ANGLE SETTING

BACKGROUND OF THE INVENTION

The present invention was born out of a modified automotive rear suspension system used on all Corvettes as manufactured by Chevrolet division of General Motors Corporation from 1963 to 1979. This project was aimed at reducing or eliminating camber angle change of the rear wheels during jounce and rebound travel, and to improve the vehicle performance during cornering. Cornering stability is increased by keeping both rear wheels vertical to the ground plane and parallel to each other. The rear wheels of the suspension system in question require a limited "toe in" alignment to enhance the tracking stability of the vehicle on straight roads at high speed. This implies that during cornering the vehicle's rear wheels must have a linkage design which can reduce or eliminate "toe in" whether the wheels are in jounce or rebound position.

SUMMARY OF THE INVENTION

The suspension system of this invention is comprised of an uneven length top and bottom strut linked to a control arm at each side of the differential carrier. The top struts are parallel with the bottom struts when parallel to the ground plane. Inboard, each top strut is connected to a bracket which is bolted to the differential carrier. Two support pylons are welded to the differential carrier to increase the bracket front support. Outboard, each top strut is connected to a yoke bracket which is bolted to a new bumper stop section. The bumper stop section is position welded to the control arm. Inboard, each bottom strut is connected to two extension plates welded to a bottom bracket which is bolted under the differential carrier. Outboard, each bottom strut is connected to the arm of the wheel spindle housing. Due to limited space each top strut is set 3.3 inches (nominal) shorter than the bottom strut; therefore, the vertical distance between the top and bottom strut is maximized, within the available space, at 9.850 inches (nominal) to reduce camber angle change. Starting with the struts at rest set parallel to the ground plane, this combination gives a camber angle change of six minutes of one degree at 1.5 inches jounce, and 1.5 inches rebound travel of the wheel. The struts, due to their arc motion and reference position, make the control arms on each side of the differential carrier generate precise toe change at each rear wheel during cornering.

The toe change of the wheels during cornering can be predetermined by selecting the angle of the struts at rest as viewed in reference to a leveled ground plane. The limits of toe change of the wheels during cornering can be predetermined by selecting an appropriate spring rate for the suspension system. Motion to each rear wheel is given by a drive axle fixed to the wheel spindle on one side, and made to float or slide through the gear splines at the differential carrier side. The drive axle shaft is positioned between the top and bottom strut.

DESCRIPTION OF THE DRAWINGS

In FIG. 2R the drive axle and the bottom strut have been removed from the view to highlight the details of the top strut of the suspension system.

DESCRIPTION OF PRIOR ART

Figure 1L:
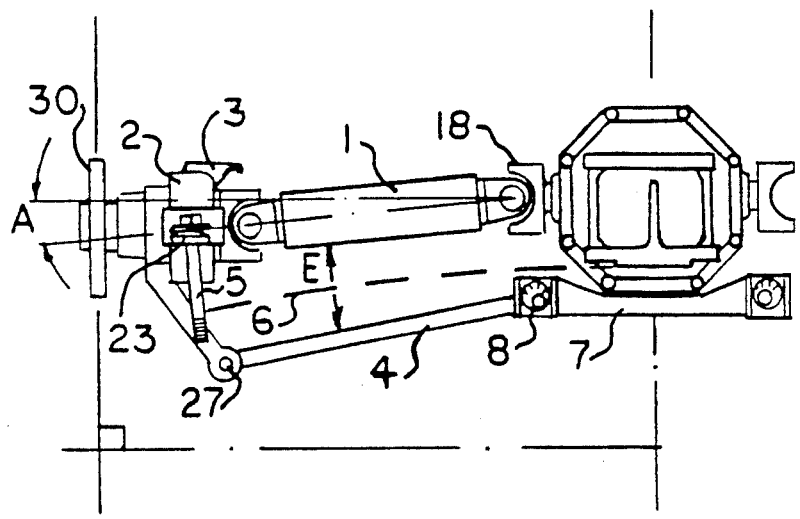
FIG. 1L is a half plane view of the Corvette standard suspension system or conventional embodiment.
Figure 2L:
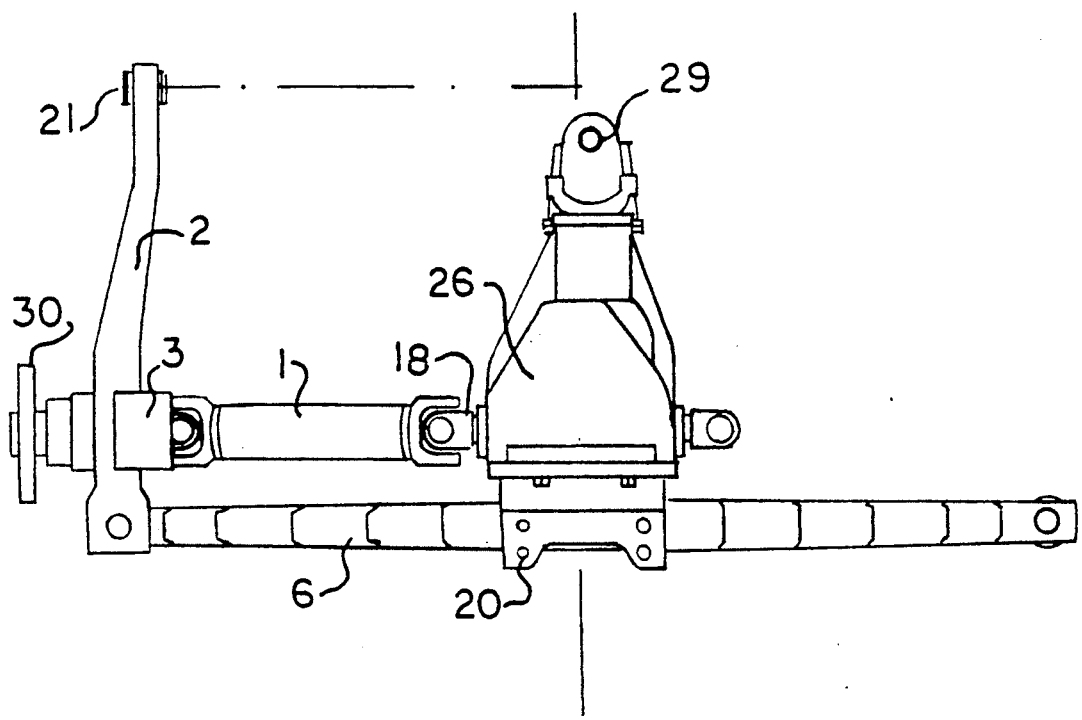
FIG. 2L and FIG. 2R are the top views of the plane views of FIG. 1L and FIG. 1R.

Prior Art—FIG. 1L and FIG. 2L.

Outboard a drive axle (1) is connected with universal joint to a wheel spindle (30), inboard the drive axle (1) is connected with universal joint to differential carrier yoke shaft (18). The yoke shaft (18) is retained in place in the differential carrier (26) by a true arc retainer ring. The drive axle (1) functions also as the lateral support link of the suspension system. Wheel spindle (30) is retained in a housing (27). The wheel spindle housing (27) is bolted to a control arm (2).

Outboard, a strut (4) connects to the spindle housing arm (27), inboard to the bracket (7). The function of the strut (4) is to support and control the position and the camber angle of the wheel. The cam bolt (8) is used to set the camber angle of the wheel. Bolt (5) connects the control arm (2) to a leaf spring (6). The bolt (5) is shown in FIG. 1L without the leaf spring, retainer washer, nut and rubber cushion as in (23). The drive axle (1), when at rest and with the suspension system fully loaded by the weight of the vehicle sits at an angle (A) with the ground plane. The value of the angle (A) may vary due to the tires' diameter and the leaf spring rate as selected by the vehicle manufacturer for a given production year.

Figure 4:
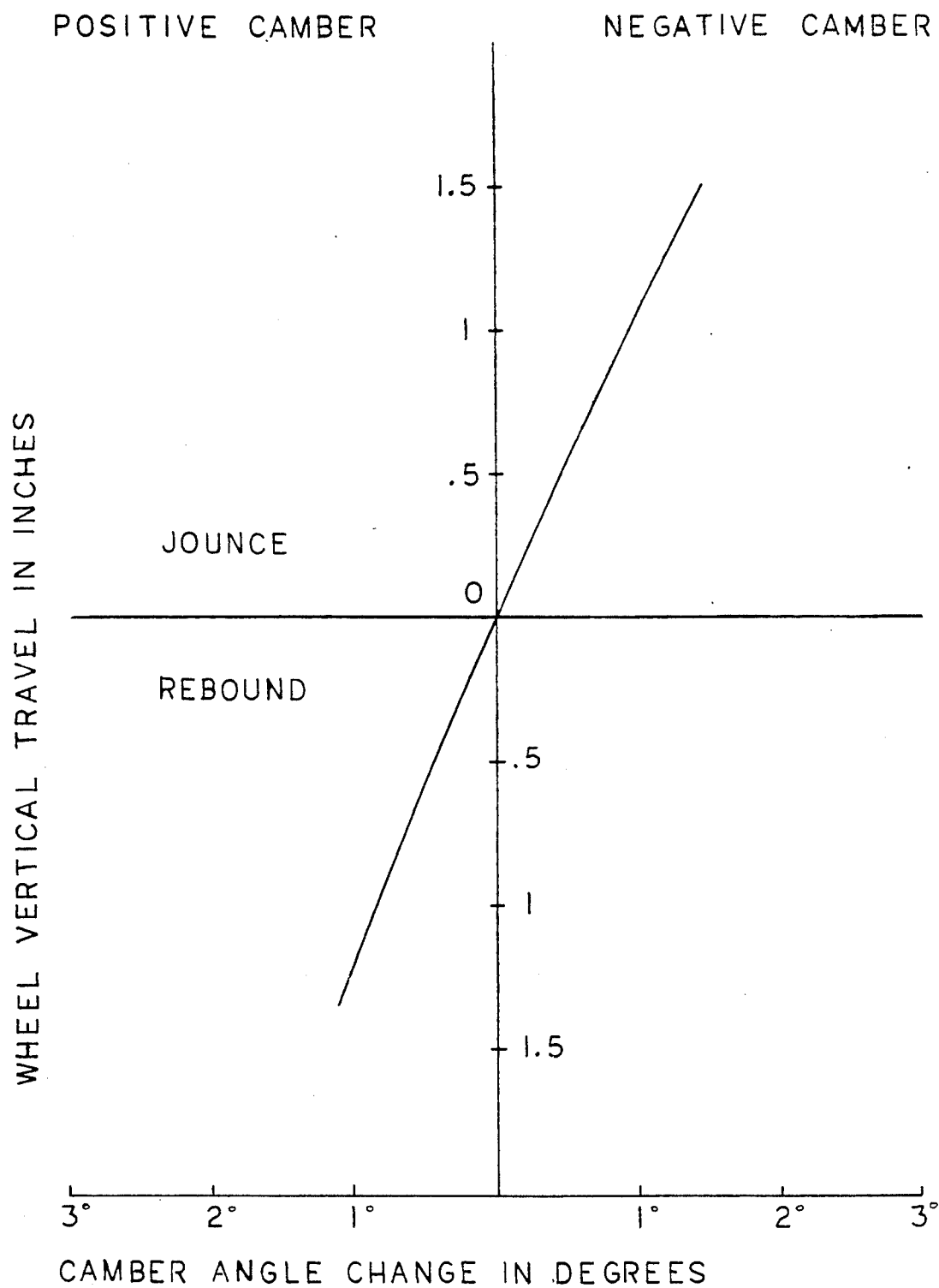
FIG. 4 is a graph of camber angle change of the wheel plotted as a function of the drive axle and the strut jounce and rebound travel as shown in FIG. 1L and 2L.

For the 1979 production year the value of the angle (A) can be from 0.8 to 3.17 degrees. The angle (E) between the strut (4) and the drive axle (1) is 6 degrees nominal. A rubber bushing (21) connects the control arm (2) to the frame of the vehicle; shims packed at each side of the bushing (21) determine the wheel toe alignment. A plate (3) welded to the control arm (2) functions as a jounce bumper stop for the suspension. The differential carrier (26) connects to the vehicle frame at point 29 and point 20. FIG. 4 is a graph which shows camber angle change of the wheel mounted to the wheel spindle (30) plotted as a function of the drive axle (1) and the strut (4) jounce and rebound travel.

The plotting of FIG. 4 is generated with the following information:

Drive axle (1) length as measured from universal joint center to universal joint center is 13.875 inches. The strut (4) length, measured from center to center, is 16.625 inches. The wheel spindle (30) camber angle, at rest is zero degrees. The vertical distance from the center of the wheel spindle (30) to the center of the wheel spindle housing arm connecting hole (27) is measured at 6.723 inches; (the zero point of the plotted function is the point at which the drive axle (1) is parallel to the ground plane).

Figure 6:
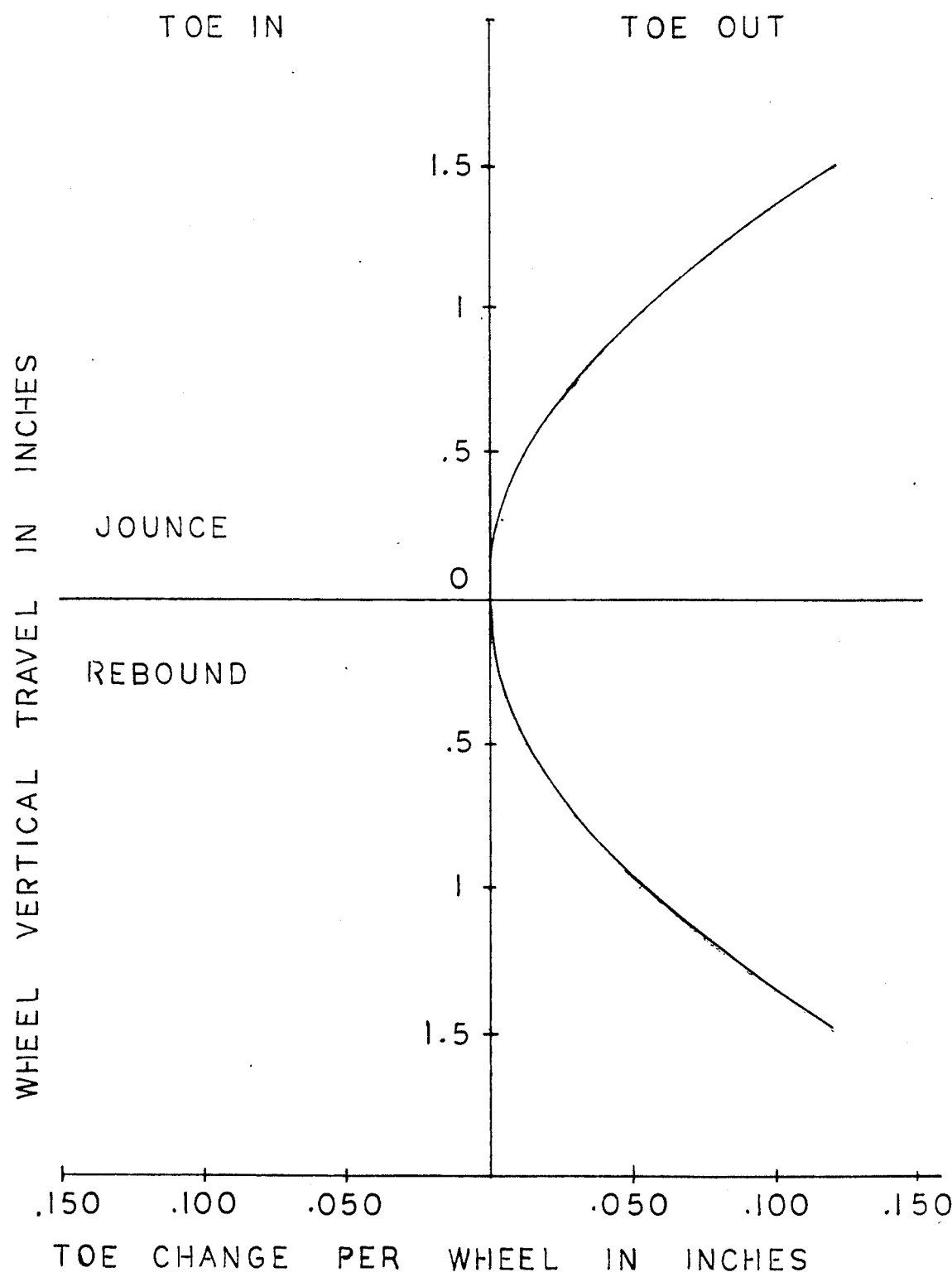
FIG. 6 is a graph of toe change of the wheel plotted as a function of the drive axle jounce and rebound travel as viewed in FIG. 1L and 2L, and the struts' jounce and rebound travel as viewed in FIG. 1R and FIG. 2R.

FIG. 6 is a graph that shows toe change (in inches) of the wheel and tire mounted to the wheel spindle (30), plotted as a function of the drive axle (1) jounce and rebound travel. The plotting of FIG. 6 is generated with the following information:

The control arm (2) length measured from the center of the bushing (21) to the center of the wheel spindle (30) is 17.312 inches. The wheel and tire diameter is 26 inches. The drive axle (1) length measured from universal joint center to universal joint center is 13.875 inches; (the zero point of the plotted function is the point at which the drive axle (1) is parallel to the ground plane).

DESCRIPTION OF PREFERRED EMBODIMENTS

Figure 1R:
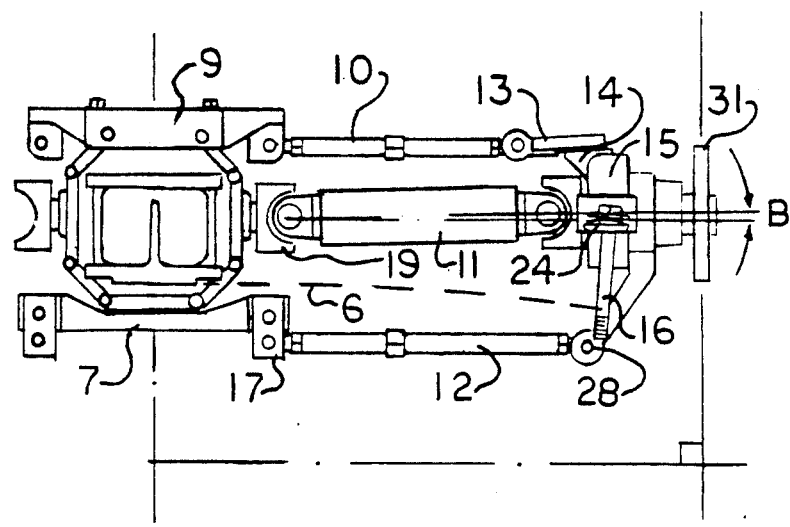
FIG. 1R is a half plane view of the invention (new system) with the new components as applied to the original system as viewed in FIG. 1L. For convenience and clarity of description, only the geometry of the main elements of the two systems is shown. Not influential components and details of some components have been omitted from these views.
Figure 2R:
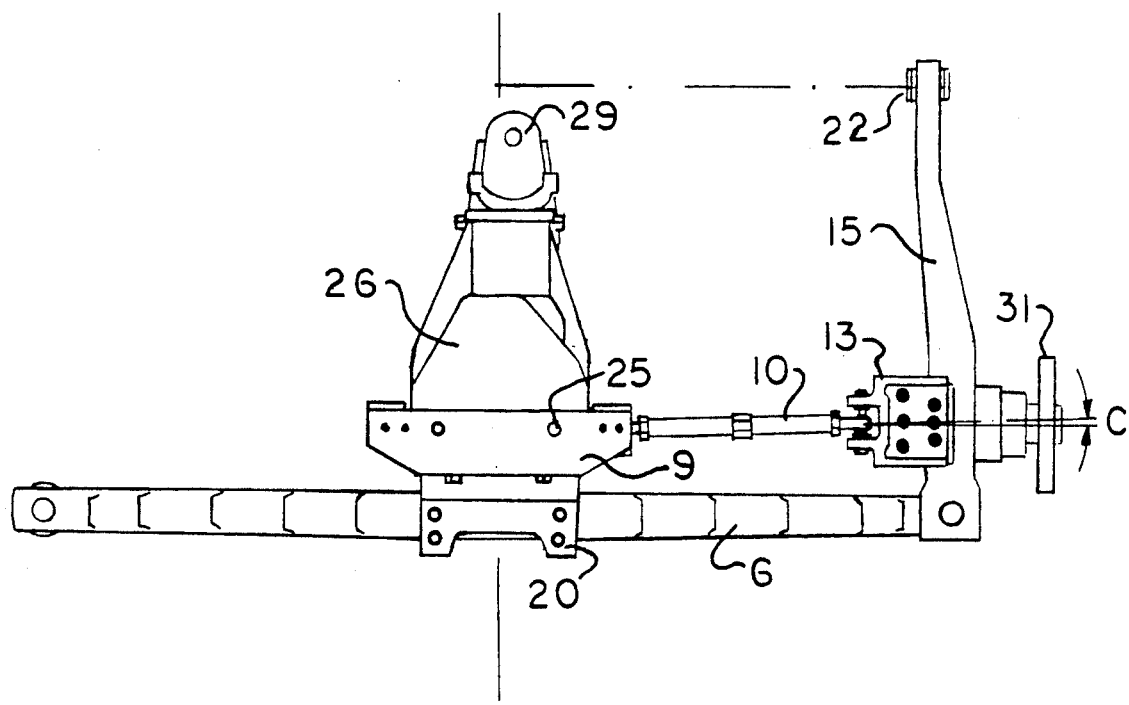

FIG. 1R and FIG. 2R—modified suspension system.

Outboard drive axle (11) is connected with universal wheel spindle (31), inboard the drive axle (11) is connected with universal joint to differential carrier yoke shaft (19). The yoke shaft (19) is free to slide in and out of the gear splines of differential carrier housing (26), a true arc retainer ring which holds the shaft (19) in place is removed. In addition, the yoke shaft (19) is shortened by 0.055 to 0.065 inches at the differential carrier side end. The shortening of the yoke shaft (19) is necessary to eliminate binding of the drive axle (11) with the linkage of struts (10 and 12) for the rebound range of the suspension travel. The function of the top strut (10) and the bottom strut (12) is to give the suspension system lateral support, and control camber angle change and toe change of the wheel and tire during jounce and rebound travel. In the preferred embodiment as viewed in FIG. 1R and FIG. 2R, the drive axle (11) has no control function of the suspension system relative to drive axle (1) viewed in FIG. 1L and FIG. 2L. The bottom strut (12) is parallel to the top strut (10), as shown in FIG. 1R. Outboard, the strut (12) is connected with a spherical rod end to wheel spindle housing arm (28). The wheel spindle housing (28) is connected to control arm (15).

Figure 3:
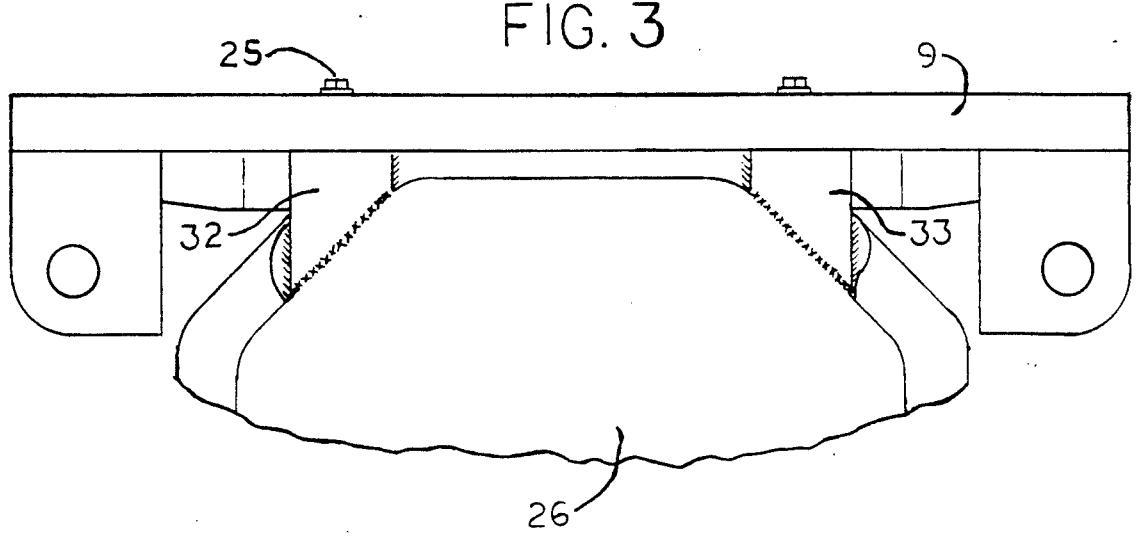
FIG. 3 shows details of the top struts bracket and the two support pylons welded to the differential carrier. The pylons are not visible in FIG. 1R and FIG. 2R.

Inboard, the strut (12) is connected with a spherical rod end to two extension plates (17). The extension plates (17) are position welded to bottom bracket (7). Outboard, the top strut (10) is connected with a spherical rod end to yoke bracket (13). The yoke bracket (13) is bolted to support plate (14). The support plate (14) is position welded to the control arm (15) following the removal of the original bumper stop plate as viewed in FIG. 1L, component (3). The bracket (13) functions also as the jounce bumper stop plate. Inboard, the strut (10) is connected with a spherical rod end to top bracket (9). The strut (10) connects to the bracket (9) with an angle (C) which is 1.4 degrees—FIG. 2R. The bracket (9) is bolted to the differential carrier (26). To increase the bracket (9) support, two pylons (32-33), FIG. 3, are position welded to the differential carrier housing (26). A bolt (25), FIG. 2R and FIG. 3, is one of the two bolts connecting the bracket (9) to the support pylons (32) and (33). A bolt (16), approximately 2 inches longer than bolt 5, connects the control arm (15) to the leaf spring (6). The bolt (16) is used to set the angle of the struts (10-12) at rest as viewed in reference to a leveled ground plane. The struts (10-12) as viewed in FIG. 1R are set parallel to the ground plane hence the angle at rest is zero degrees. The angle of the struts (10-12) at rest can be changed by increasing or decreasing the length of the bolt (16) as it connects to the leaf spring (6). The bolt (16) is shown in FIG. 1R without the leaf spring (6), retainer washer nut and rubber cushion as in (24). The angle (B) is approximately 1 degree (FIG. 1R).

Figure 7:
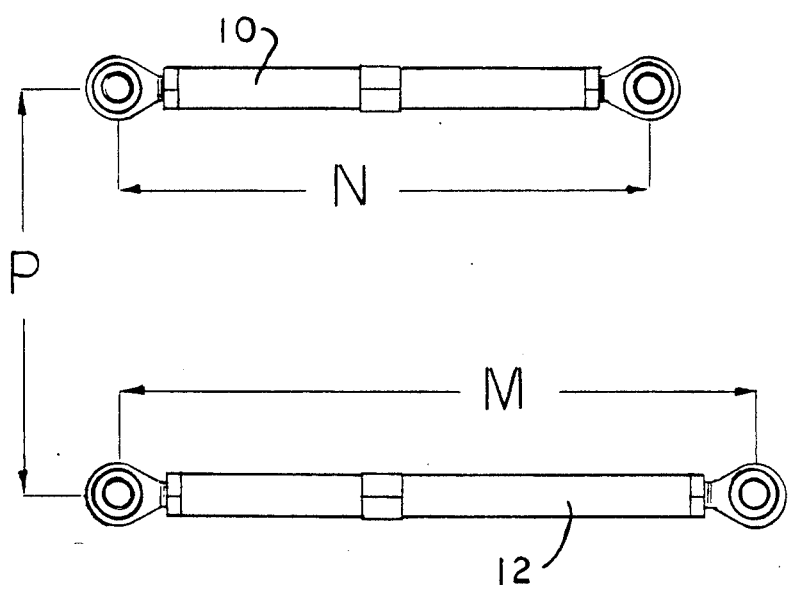
FIG. 7 is a sketch giving dimensional arrangement of the top and bottom struts as they appear in FIG. 1R.
Figure 5:
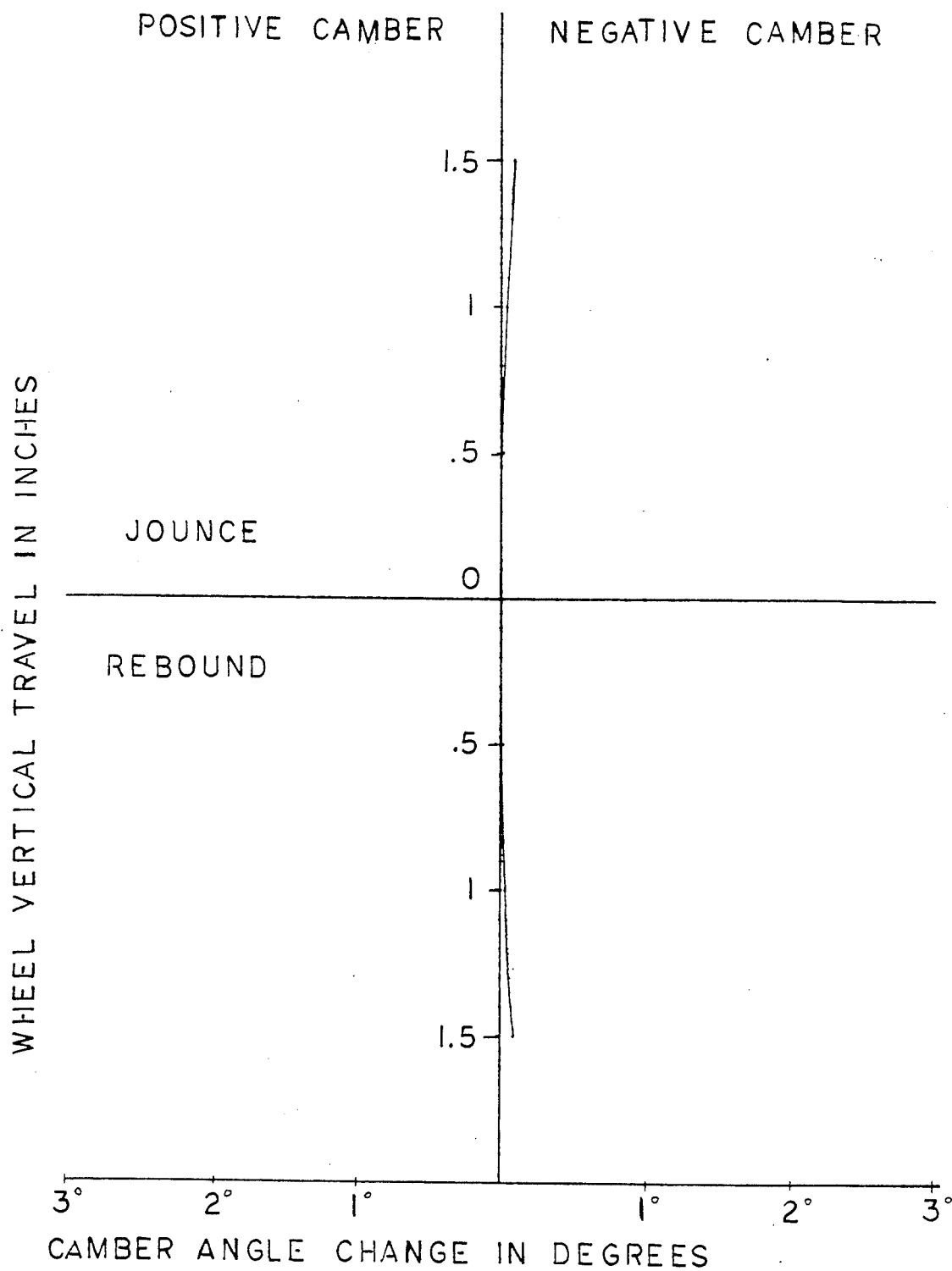
FIG. 5 is a graph of camber angle change of the wheel plotted as a function of the struts' jounce and rebound travel, as shown in FIG. 1R and FIG. 2R.

The angle (B) is the angle of the drive axle (11) with the ground plane, when the suspension is fully loaded by the weight of the vehicle, and the angle of the struts (10-12) at rest as viewed in reference to a leveled ground plane is zero degrees. A rubber bushing (22) connects the control arm (15) to the frame of the vehicle; shims packed at each side of the bushing (22) determine the wheel toe alignment. FIG. 5 is a graph that shows camber angle change of the wheel and tire mounted to wheel spindle (31) plotted as a function of the struts (10 and 12) jounce and rebound travel. The plotting of FIG. 5 is generated with the following information:

FIG. 7—top strut length (N) is 13.090 inches (nominal), measured from center to center of the spherical rod ends. FIG. 7—bottom strut length (M) is 16.390 inches (nominal) measured from center to center of the spherical rod ends. FIG. 7—the distance (P) between the top strut (10) and the bottom strut (12) is 9.850 inches. The wheel spindle's (31) camber angle at rest is zero degrees.

It will be seen in FIG. 5 that the camber angle change of the modified suspension system as viewed in FIG. 1R and FIG. 2R is much lower than the camber angle change of FIG. 4 (the conventional suspension system as viewed in FIG. 1L and FIG. 2L).

The FIG. 6 graph applies also to the modified system. The curve generated by plotting jounce and rebound travel of the struts (10 and 12) is the same as the curve generated by plotting jounce and rebound travel of the drive axle (1) (the zero point of the plotted function is the point at which the struts are parallel to the ground plane). Parameters like the control arm (15) length and the wheel and tire diameter are also the same as given for the conventional embodiment. The graph of FIG. 6 indicates that both rear wheels will change toe through their vertical travel. During cornering due to centrifugal force, the vertical forces acting on the vehicle are transferred from the inside wheel to the outside wheel, the suspension spring on the outside is compressed while the inside spring is extended. This means that during cornering the struts (10 and 12) and the drive axle (1) rotate from a reference position to a point where the spring action, on each wheel, balances the shifting of the vertical forces acting on the vehicle, thus stopping the vehicle from further rolling. The described physical phenomena can be utilized to make the rear wheels of the suspension system assume a favorable cornering alignment by reducing the wheels' "toe in" as the vehicle rolls into the turn. Looking at the zero point on the curve of FIG. 6, it is clear that to make both rear wheels generate "toe out" as to reduce "toe in" during cornering, the struts (10 and 12) and the drive axle (1) must rotate from a reference position which puts the struts and the drive axle parallel to the ground plane. However, only the modified suspension system (FIG. 1R, FIG. 2R) makes it possible to change the reference position of the struts, as to predetermine the rear wheels' toe alignment during cornering, without effecting the wheels' camber angle setting.

As viewed in FIG. 5, the camber angle change of the wheel is only six minutes of one degree at 1.50 jounce and 1.50 rebound travel of the wheels; six minutes of one degree can be considered a negligible change as far as keeping the tires perpendicular to the ground plane. Thus it can be said that, by changing the angle of the struts (10 and 12) at rest as viewed in reference to a leveled ground plane, the modified rear suspension system, with the appropriate leaf spring (6) rate, can generate cornering response, which is conditional to the toe change of each rear wheel and independent of the camber angle change of the wheels, which as proven can be considered negligible.

Having described my invention, what I claim is:

1. In a suspension and final drive system for a rear wheel assembly of a motor vehicle comprising:
   a control arm extending in the longitudinal direction of the vehicle, said control arm having a front portion connected to a frame of the vehicle and a rear portion connected to the wheel assembly;
   a differential carrier having a yoke shaft extending from a side thereof;
   a leaf spring extending transversely of the vehicle, and end of said leaf spring connected to said control arm and another section connected to said differential carrier;
   a drive shaft connected by means of a universal joint to the wheel assembly and to the yoke shaft; and
   a lower link strut extending transverse to the vehicle frame and connected between the differential carrier and the wheel assembly;
   the improvement comprising:
   an upper link strut extending transverse to the vehicle frame, said upper link strut having an outboard and pivotally mounted to said control arm and an inboard end pivotally mounted to the top of the differential carrier;
   said lower link strut having an outboard end connected to an extension plate which is secured to a bracket connected to the lower part of the differential carrier and which projectss downwardly therefrom; and
   wherein said upper link struct is shorter than said lower link strut and the outboard end of said upper link strut is inboard of the outboard end of the lower link strut, and wherein said yoke shaft is free to move into and out of the differential carrier.

2. The method of modifying a suspension and drive system for a rear wheel of a motor vehicle comprising:
   a control arm extending in the longitudinal direction of the vehicle, said control arm having a front portion connected to a frame of the vehicle and a rear portion connected to the wheel assembly;
   a differential carrier having a yoke shaft fixed to the differential carrier with a true arc retainer ring and which extends from a side of said differential carrier;
   a leaf spring extending transversely of the vehicle, an end of said leaf spring connected to said control arm with a bolt and another section connected to said differential carrier;
   a drive shaft connected by means of a universal joint to the wheel assembly and to the yoke shaft; and
   a lower link strut extending transverse to the vehicle frame and connected between the differential carrier and the wheel assembly;
   said method comprising:
   providing an upper link strut transverse to the vehicle frame by pivotally attaching one end thereof to said control arm and an opposite end to the top of said differential carrier;
   affixing an extension plate to a bracket connected to a lower section of said differential carrier and connecting an inboard end of said lower link strut thereto;
   shortening the yoke shaft to permit proper following geometry of the drive shaft during movement of the wheel;
   removing said true arc retainer ring from said yoke shaft, thereby permitting the yoke shaft to float; and
   substituting the bolt that connects the control arm to the leaf spring with a longer bolt in order to increase a span of adjustment.

3. The suspension and drive system of claim 1 wherein during cornering, due to rolling of the frame, a predetermined toe change is produced which is proportional to a displacement angle generated by said upper and lower link struts rotating from a reference position; wherein the displacement angle of said struts can be adjusted by selecting an appropriate spring rate of the leaf spring; and wherein the predetermined cornering toe change of the rear wheel can be obtained without effecting a camber angle setting of the wheel for a selected range of jounce and rebound of the wheel.

* * * * *